United States Patent [19]
Payne et al.

[11] Patent Number: 5,399,310
[45] Date of Patent: Mar. 21, 1995

[54] METHOD OF USING MOLD RELEASE AGENTS

[75] Inventors: Jeffrey S. Payne; David L. Martin, both of Newmarket, N.H.

[73] Assignee: The Dexter Corporation, Windsor Locks, Conn.

[21] Appl. No.: 35,736

[22] Filed: Mar. 23, 1993

[51] Int. Cl.$^6$ .................. B29C 39/02; B29C 33/62
[52] U.S. Cl. .................... 264/338; 264/300; 264/328.6; 106/38.24
[58] Field of Search ............... 264/130, 338, 300, 51, 264/328.6; 106/38.24, 38.7, 243

[56] References Cited

U.S. PATENT DOCUMENTS

| | | | |
|---|---|---|---|
| 3,413,390 | 11/1968 | Heiss | 264/338 |
| 3,640,769 | 2/1972 | Watters . | |
| 3,952,079 | 4/1976 | Ozelli et al. | 264/338 |
| 3,992,502 | 11/1976 | Krishnan | 264/338 |
| 4,038,088 | 7/1977 | White et al. | 106/38.24 |
| 4,111,861 | 9/1978 | Godlewski . | |
| 4,426,229 | 1/1984 | Bolton et al. . | |
| 4,454,050 | 6/1984 | Bertell . | |
| 4,473,403 | 9/1984 | Wesala . | |
| 4,491,607 | 1/1985 | Wesala | 106/38.24 |
| 4,585,829 | 4/1986 | Kuo et al. . | |
| 4,645,537 | 2/1987 | Gardenier et al. . | |
| 4,764,537 | 8/1988 | Horn et al. | 264/51 |
| 4,892,585 | 1/1990 | Fischer et al. | 106/38.24 |
| 5,008,065 | 4/1991 | Okumura et al. . | |

FOREIGN PATENT DOCUMENTS 1162355  2/1984  Canada ................... 264/338

*Primary Examiner*—Mathieu D. Vargot
*Attorney, Agent, or Firm*—Pearne, Gordon, McCoy & Granger

[57] ABSTRACT

Mold release agents and methods for molding plastics are provided. They are especially applicable to polyurethane-based reaction injection molding (RIM) systems. The mold release agent includes the lithium, sodium, or potassium salt, or a mixture thereof, of an oligomer of monomeric units or a mixture of said oligomers, the monomeric units being selected from the group consisting of carboxylic fatty acids having at least 14 carbon atoms, preferably 14 to 24 carbon atoms, the salt of the oligomer preferably being soluble in water or water/alcohol. Preferably, the Li and Na salts of $C_{36}$ and $C_{44}$ dicarboxylic fatty acids are used. Preferred embodiments of the present invention permit the use of water without alcohol in the formulation.

26 Claims, No Drawings

METHOD OF USING MOLD RELEASE AGENTS

BACKGROUND OF THE INVENTION

This invention relates to mold release agents and methods of using mold release agents. More particularly, the invention relates to release agents used in coating molds and mold tool surfaces for forming plastics, especially in connection with the molding of polyurethane plastics.

DESCRIPTION OF RELATED ART

Polyurethane and other plastic parts are used extensively in the manufacture of automobiles, furniture, industrial service parts and in home construction. In this connection molds are used to produce the polyurethane article. One constant problem has been that the polyurethane part tends to stick to the mold at the conclusion of the molding operation. To facilitate the release of molded polyurethane articles from the mold, it has been known to coat the mold cavity with a mold release agent (an external mold release agent). As described in U.S. Pat. No. 4,585,829, external mold release agents have consisted of natural or synthetic compounds, such as silicone oils, mineral oils, waxes, fatty acid derivatives, glycols, etc. Generally, these release agents are either dissolved or dispersed in a liquid diluent or carrier and are sprayed into the mold cavity. Such known external release agents require a reapplication of the release agent to the mold after each molding cycle or a limited number of molding cycles.

At the end of each molding cycle, the release agent should enable an easy release of the molded part and leave no visible surface defects on the molded part.

As described in U.S. Pat. No. 4,473,403, incorporated by reference, release agents have generally contained a blend of several ingredients including active ingredients which cause the release action, a solvent or diluent, a film-former, a drying or curing agent, and added lubricant to enhance releasability. Ingredients range from greases, natural waxes, soaps, emulsions, mineral oils, fats, lecithins, metal stearates, silicones, fluorocarbons, synthetic waxes, organophosphates, polyaliphatic alcohols and polymeric resins. See also U.S. Pat. No. 4,491,607, which is incorporated by reference.

Traditional sacrificial release agents such as waxes and soaps provide molders with limited numbers of releases before recoating is required. One object of this invention is to provide a more durable release coating, so that greater numbers of parts may be molded in a particular mold before the release agent must be reapplied.

Traditional sacrificial release agents such as soaps or metal stearates are dissolved, at least in part, in alcohols. These solvents are often flammable. Other objects of the invention are to provide a release coating with lower flammability to the plastic molding market using a solvent which is preferably nonflammable and with the release coating containing no chlorofluorocarbons, and providing release agents with lower concentrations of volatile organic compounds. Current environmental requirements encourage or require minimization of volatile organic compounds in process aids such as release agents.

SUMMARY OF THE INVENTION

A mold release agent for coating molds for forming plastics, such as polyurethane plastics, is provided. The mold release agent comprises an oligomeric salt agent, the oligomeric salt agent being the lithium, sodium, or potassium salt, or a mixture thereof, of an oligomer of monomeric units or a mixture of said oligomers, the monomeric units being selected from the group consisting of carboxylic fatty acids having at least 14 carbon atoms, preferably 14 to 24 carbon atoms, and the oligomeric salt agent preferably being soluble in water or water/alcohol. Preferably, at least 70% by weight of said oligomeric salt agent is the lithium, sodium, or potassium salt, or a mixture thereof, of a dimer of monomeric units or a mixture of said dimers, the monomeric units being selected from the group consisting of $C_{18}$ and $C_{22}$ carboxylic fatty acids. The mold release agent may include a diluent. The diluent is preferably selected from the group consisting of water, alcohol, and water/alcohol. The oligomeric salt agent is preferably present in the diluent in a concentration of about 0.05–10% by weight. Preferably, the diluent is water.

A method for molding plastics, such as polyurethane plastics, is also provided. The method utilizes the mold release agent of the present invention.

DESCRIPTION OF PREFERRED EMBODIMENTS

As used in the specification and claims, oligomer means a polymer consisting of two, three, or four monomeric units. The monomeric units of the present invention are carboxylic fatty acids having at least 14 carbon atoms, preferably 14 to 24 carbon atoms. More preferably, the monomeric units are $C_{18}$ and $C_{22}$ carboxylic fatty acids which form the $C_{36}$ and $C_{44}$ dimers described herein. It is believed that salts of oligomers, such as dimers and trimers, of monomeric units having 14 to 24 carbon atoms are sufficiently water soluble to achieve the benefits of the present invention. Salts of oligomers formed from $C_{26}$ and $C_{28}$ carboxylic fatty acids (such as $C_{52}$ and $C_{56}$ dimers) are believed to be soluble in water or water/alcohol sufficiently to achieve the benefits of the present invention. Salts of oligomers formed from carboxylic fatty acids having more than 28 carbon atoms are believed to be useful so long as soluble in water or water/alcohol or alcohol. Examples of release agents are shown using $C_{36}$ and $C_{44}$ dimers, but other release agents formed using as monomers carboxylic fatty acids having at least 14 carbon atoms, preferably 14 to 24 carbon atoms, will work for the same reasons and by using the same methods.

Preferably the monomers are straight-chain carboxylic fatty acids, such as stearic or docosanoic, but with 1,2, or 3 points of unsaturation so the polymerization, such as dimerization or trimerization, may occur. In the dimerization process, two fatty acid monomers are joined together. But it is believed that generally this polymerization does not occur at the terminal carbon of the fatty acid. Fatty acids are sometimes referred to herein as carboxylic fatty acids. The monomers may also be branched. The oligomers may be saturated or unsaturated dimers, trimers, or tetramers, or may be formed from different size monomers, such as a $C_{14}$ monomer joined to a $C_{18}$ monomer, or a $C_{16}$ monomer joined to a $C_{22}$ monomer. Preferably, the invention includes the use of $C_{28}$ to $C_{48}$ dimers and $C_{42}$ to $C_{72}$ trimers; it is believed that release agents formed from these dimers and trimers are water-soluble.

Conventional soap release agents such as sodium oleate are formed from monofunctional acids and thus have only one point of attachment to the mold surface. The soap molecules of the present invention are difunctional, trifunctional, etc., since formed from dicarboxylic, tricarboxylic, etc. fatty acids, and thus have two or more points of attachment to the mold surface, a stronger attachment. If one end becomes detached, there is another end still anchoring the molecule, allowing the free end to reattach.

As known in the art, the mold release agent of the present invention can be blended or mixed with other known prior art release agents or additives or ingredients to obtain different desired performance characteristics. See U.S. Pat. Nos. 4,473,403 and 4,491,607. For example, additives may be used to increase slip. The oligomeric salt agent of the present invention is preferably at least 50% by weight of the solids of the final release agent, and can be, for example, 25% or 75% by weight.

Preferably at least 70%, more preferably at least 80%, and even more preferably at least 90%, by weight of the oligomeric salt agent of the present invention is the salt of a dimer of monomeric units or a mixture of said dimers, the monomeric units preferably being selected from the group consisting of $C_{18}$ and $C_{22}$ carboxylic fatty acids. Different dimers and trimers can be mixed in a mold release agent.

In the practice of the present invention, water at ambient temperature is the preferred diluent, since it is nonflammable and does not contain volatile organic compounds, chloronated solvents or chlorofluorocarbons. Diluent, as used herein, generally also means solvent. Less preferably, alcohol, such as ethanol, isopropyl alcohol, normal propyl alcohol, and butanol, or water/alcohol, can be added or used as a diluent. With regard to oligomers formed from monomers having 24, 26, 28, and more carbon atoms, alcohol may have to be added to the water diluent to make the oligomer soluble. Alcohol tends to solublize fatty acids. Water/alcohol means a mixture of water and alcohol. A common water/alcohol diluent contains 10–40% alcohol by weight. Alcohol generally helps to dissolve the release agent and wet the mold surface. The use of alcohol generally lessens the need for and usefulness of a surfactant. One aspect of the present invention is that alcohol is generally or preferably not needed as a diluent or surfactant or wetting agent, and preferably, the mold release agent is completely alcohol-free with water as the sole diluent. In addition to alcohol, it is believed that any water-miscible solvent known in the art, such as glycol ether (preferably with water, designated as water/glycol ether) can be used as a diluent.

As described herein, acid or base may be added to the diluent to adjust the pH thereof. The pH of the diluent is preferably basic enough so that the ingredients, particularly the carboxylic fatty acid, are soluble. Unreacted acid may cause a haze. It is preferred to keep the pH as low as possible while retaining a clear solution. The pH is preferably 8.0–12.5 and more preferably 8.5–10.5, although solutions outside these pH ranges may be suitable.

As is known in the art, other additives such as bacteriocides, corrosion inhibitors, preservatives, fragrances, colorants, etc. may be added in effective amounts to the disclosed formulations.

The mold release agent of the present invention is typically manufactured in solution, but it may be concentrated using techniques known in the art to form an undiluted 100% solid (which can, for example, be crumbled or flaked) or viscous liquid, or a slurry of any dilution or concentration down to a ready-to-use formulation. In many instances the more concentrated version (100% solids by weight, or concentrated slurry, such as 25% diluent 75% solids) is preferred, to save weight, space, and shipping costs. The concentrated formulation can then be diluted at the end use location by dilution with distilled or de-ionized water or other diluent to form the ready-to-use formulation.

The preferred ready-to-use formulation for a user sensitive to build-up on the mold and desiring water without alcohol as the diluent is about 1–3.5%, preferably about 1–2%, solids by weight and about 0.05–0.1% surfactant by weight. Less solids generally means less mold release agent build-up, more releases per percent solids, but fewer overall releases per coating. The solids can preferably be increased to about 4–5% by weight if more releases per coating are desired. If the user is not organic solvent sensitive, alcohol, such as isopropyl alcohol, can be added as a diluent.

The solids of the preferred ready-to-use formulation are generally almost completely attributable to the oligomeric salt agent, such as the salt of the dimer and trimer acid. The ready-to-use formulation is, by weight percent solids and by weight percent oligomeric salt agent in the diluent, preferably about 0.05–15%, more preferably about 0.05–10%, and even more preferably about 0.5–5%.

The invention is particularly useful with regard to polyurethane RIM (reaction injection molding) technology. The invention is also applicable to plastics molding generally, including thermosetting resins and thermoplastic polymers. The invention is applicable to thermoelastomers, expandable plastics including expandable polyurethanes, and also polyurethane, polyisocyanurate, polyurea, polyester, and combinations thereof.

The invention in another aspect concerns a method of molding a plastic article, comprising the steps of coating or applying a uniform wet film of the release agent of the present invention onto the internal cavity surfaces of a mold maintained at elevated temperature sufficient to vaporize the diluent, and maintaining the coated mold at elevated temperature until the thus applied film is dry. Advantageously, the method avoids the use of environmentally-objectionable diluents, such as alcohol. The film coat can be applied in any suitable way such as spraying (air, airless, electrostatic, or aerosol), brushing, wiping, dipping, or rolling. Generally, using methods and techniques known in the art, multiple layers of mold release agent may be applied to the mold surface, with drying between each layer, before the liquid plastic or plastic reaction mixture is inserted, the inserted material is solidified, and the resulting article removed from the mold.

The invention is illustrated by the following examples of preferred mold release agents.

EXAMPLE 1

At ambient temperature 5.2 g of a 10% lithium hydroxide solution (aqueous) was added to 188.6 g of deionized water (the water possessing a hardness of <5 grains/gallon), the water being referred to herein as a diluent or solvent. With stirring, 6.0 g of Pripol 1004 dimer acid was slowly added to the base solution. Upon reaction, the acid dissolved in the aqueous medium. Pripol 1004 is produced by Unichema International and is available from Unichema North America, 4650 S.

Racine Ave., Chicago, Ill. 60609. Pripol 1004 is predominantly dicarboxylic fatty acid, specifically C44 dimer acid (having 44 carbon atoms). C44 dimer dicarboxylic fatty acid has the approximate chemical formula $C_{44}H_{86}O_4$, subject to the degree of unsaturation. It is produced by the polymerization, predominately dimerization and trimerization, of C22 unsaturated fatty carboxylic acid monomers having typically 1, 2, or 3 points of unsaturation. The weight percent composition of Pripol 1004 is: C22 monomer—0.1 (max.); C36 dimer plus intermediate—4 (max.); C44 dimer (dicarboxylic fatty acid)—95 (min.); and C66 trimer (tricarboxylic fatty acid)—1 (max.). Due to a hydrogenation procedure, Pripol 1004 has extremely low unsaturation.

While stirring, the pH of the solution was adjusted by the drop-wise addition of additional LiOH or dimer acid to give a clear, colorless solution with the lowest pH possible. Thus, the total amount of base which is added to the solution is enough to neutralize the acid, and slightly more is added if necessary to ensure that the acid remains soublized and dissolved, yet the pH is maintained as low as possible. The solution thus formed, within the meaning of the specification and claims herein, contains an oligomeric salt agent, the oligomeric salt agent being the lithium salt of an oligomer of monomeric units or a mixture of said oligomers, the monomeric units being selected from the group consisting of $C_{22}$ carboxylic fatty acids; and at least 70% by weight of said oligomeric salt agent present in the solution is the lithium salt of a dimer of monomeric units or a mixture of said dimers.

To the resulting solution, 0.2 g of Aerosol OT 75% Aqueous surfactant or wetting agent was added. Aerosol OT 75% Aqueous is, by weight, 75% sodium dioctyl sulfosuccinate, 6.5% ethanol, and 18.5% water. It has CAS No. 000577-11-7 and is available from American Cyanamid Co., Wayne, N.J. The solution was stirred for a further 15 minutes to disperse the surfactant. At this point the solution was, by weight, 0.1% surfactant, 3% acid, 0.26% LiOH, and 96.64% water as diluent, without accounting for the acid-base reaction and the water and alcohol in the surfactant.

The percent solids by weight of the resulting solution was determined by heating to constant weight and calculating the percent non-volatile. In this case the heating was at 80° C. for 2 hours and at 140° C. for 1 hour and then reweighing to determine the percent solids. Percent solids by weight, as used in the claims, means as determined by this method or a comparable method. Using the percent solids by weight thus determined (2.845%, or about 3%, as anticipated), the formulation was then diluted to 1.5% solids by weight with deionized water to produce the final solution. As can be seen, the solids are essentially the lithium salt of the Pripol 1004 acid and the non-volatile portion of the surfactant. The pH was 10.15.

This release agent formulation was evaluated by spraying it onto a steel mold having a temperature of 60°-70° C. Three coats were applied with 5 minute intervals between coats to permit the coats to dry. A polyurethane mixture was prepared by mixing Mobay Bayflex 210A and Bayflex 210B for 10 seconds with a Hamilton Beach mixer. The polyurethane mixture was then inserted into the preheated mold, at 60°-70° C., and allowed to react and cure for 15 minutes before release was attempted. The durability/efficiency of the release agent was determined by repeating the release process until the release was sufficiently hard as to produce cohesive failure in the polyurethane. This was classed as release failure and the number of successful releases up to that point was recorded. As used in the claims, the molding of a plastic includes the molding of polyurethane such as described above.

Using the above methodology and taking the average of three tests, a total of 17 releases were obtained before it was necessary to reapply the mold release agent. By dividing 17 by 1.5, this release agent gave 11.33 releases per 1% solids.

EXAMPLES 2-35

The results of Examples 2-35 are given in the attached Table 1. (See page 14). For clarity, the results of Example 1 are also included. The percentages are percentages by weight of the formulation. The remainder of the formulation is water. Thus, for example, in Example 32, the sample being tested was 3.82% solids by weight (the solids being determined by the procedure described in Example 1), 32.43% alcohol by weight, and 0.10% surfactant by weight. The remainder, other than acid, base, alcohol, and surfactant, is water. As previously described, the % solids by weight is roughly equivalent to the % acid salt by weight plus the % surfactant by weight.

The procedures used in Examples 2-35 were essentially the same as described above, although generally multiple release tests were not run. The purpose of the testing was to determine how many releases could be obtained before the release agent had to be reapplied to the mold surface, and to calculate the number of releases per 1% solids (Releases/Solids).

In Examples 1-35, Acid #1 is Pripol 1004, described above. Acid #2 is Hystrene 3680, CAS No. 61788-89-4, available from Humko Division of Witco Corp., 1231 Pope Street, Memphis, Tenn. 38101. Hystrene 3680 is unsaturated polymerized fatty acid, specifically predominantly a C36 dicarboxylic fatty acid, produced by the dimerization of two unsaturated C18 carboxylic fatty acid monomers, but also containing C54 tricarboxylic fatty acid produced by the trimerization of three C18 carboxylic fatty acid monomers. C36 dicarboxylic fatty acid has the approximate chemical formula $C_{36}H_{70}O_4$, subject to the degree of unsaturation. Hystrene 3680 is minimum 83 percent C36 dimer acid and maximum 15.5 percent C54 trimer acid.

Acid #3 is Empol 1010, available from Emery Industries, Inc., Cincinnati, Ohio. It is a purer form of Hystrene 3680, having a minimum 97 percent C36 dimer dicarboxylic fatty acid and maximum 3 percent C54 trimer tricarboxylic fatty acid. Acid #4 is Pripol 1009, also available from Unichema. Pripol 1009 is similar to Empol 1010. It is minimum 98 percent C36 dimer dicarboxylic fatty acid and maximum 1 percent C54 trimer tricarboxylic fatty acid. Due to hydrogenation, it has low unsaturation. Acid #5 is Pripol 1025, also available from Unichema. Pripol 1025 is similar to Hystrene 3680. It is minimum 74-80 percent C36 dimer dicarboxylic fatty acid and maximum 17-21 percent C54 trimer tricarboxylic fatty acid. Due to a hydrogenation procedure, it has low unsaturation. The acid values of Hystrene 3680, Empol 1010, and Pripol 1009, 1025, and 1004 are, respectively, 190-197, 191-197, 194-198, 192-197, and 159-164 (mgKOH/g).

Acid #6 is, by weight, 8 percent oleic acid and 92 percent myristic acid. These are both monomeric acids. Acid #7 is, by weight, 20 percent oleic acid and 80 percent myristic acid. Acid #8 is 100 percent myristic acid. Acid #9 is 100 percent oleic acid. The sodium salts of oleic and myristic acids are known as release agents and they are included in this table for purposes of comparison.

The surfactants or wetting agents are identified by the letter A or B next to the percent in the surfactant column. Surfactant A is Aerosol OT 75% Aqueous, described above. Surfactant B is FC-430 Fluorad, nonionic fluoroaliphatic polymeric esters and <1.5% toluene, available from 3M Company, St. Paul, Minn. These surfactants act as wetting agents on the mold surface. As is well known in the art, other surfactants for the same purpose can be substituted or utilized, such as those listed or identified in J.S. Dick, *Compounding Materials for the Polymer Industries*, page 273 et seq. and *McCutcheon's Emulsifiers and Detergents, North American Edition*, McCutcheon's Division, The Manufacturing Confectioner Publishing Co., Glen Rock, N.J. (1988). Surfactant, as used in the claims, refers to surfactants such as these and similar surfactants. Anionic and nonionic surfactants are preferred. In the practice of the present invention, surfactants preferably make up about 0.01–0.5%, and more preferably about 0.02–0.2%, by weight of the formulation. Preferably not more than 10% of the overall solids is surfactant and preferably not more than 1% by weight of the ready-to-use formulation is surfactant. Some surfactants or other minor additives may contain a small proportion of alcohol. Preferably the overall mold release agent formulation will contain less than 0.1, more preferably less than 0.03%, even more preferably less than 0.01%, and most preferably zero percent by weight of alcohol or other volatile organic compound.

As to the Li, Na, and K cation, the monomer or dimer acids were neutralized with either LiOH, NaOH, or KOH to produce their respective salts. In some cases the weight percent solids was a theoretical calculation based on the acid, base and surfactant used. The weight of the solids is approximately equal to the weight of the acid added plus the weight of the surfactant added. In the practice of the present invention, Li and Na are preferred cations, and Li is the more preferred cation. Also, the cations can be mixed. Lithium, being smaller, is believed to bond more strongly to the acid than Na or K and thus performs better.

In some cases alcohol was added to the aqueous medium. Water/alcohol formulations were prepared by dissolving the fatty acid in the diluent and neutralizing with the alkali metal hydroxide. Unless alcohol was added, water was the diluent.

In Table 1, Examples 1–26 illustrate formulations of the present invention, and Examples 27–35 illustrate monomeric acids of the prior art. As can be seen, all the prior art Examples require the use of alcohol as a diluent, and about half utilize a surfactant. In contrast, most of Examples 1–26, including the top six, do not require alcohol, and #9 utilizes neither alcohol nor surfactant and outperforms all of the lower group. It is believed that $C_{44}$ dimer works better than $C_{36}$ dimers; Example 1 (with $C_{44}$ dimer) provides the most Releases/Solids.

Although the preferred embodiments of this invention have been shown and described, it is understood that various modifications, substitutions, replacements and rearrangements of the components, ingredients, and methods may be resorted to without departing from the scope of the invention as disclosed and claimed herein.

TABLE 1

| Example | Acid | Salt | % Solids | pH | % Alcohol | % Surfactant | | # of Releases | Releases/ Solids |
|---|---|---|---|---|---|---|---|---|---|
| 1 | #1 | Li | 1.5 | 10.15 | 0.00 | 0.053 | (A) | 17 | 11.33 |
| 2 | #2 | Li | 1.5 | 10.31 | 0.00 | 0.049 | (A) | 16 | 10.67 |
| 3 | #2 | Li | 3.01 | 10.12 | 0.00 | 0.10 | (A) | 20 | 6.64 |
| 4 | #1 | Na | 1.41 | 10.16 | 0.00 | 0.022 | (A) | 8.67 | 6.15 |
| 5 | #2 | Li | 1.64 | 10.00 | 0.00 | 0.050 | (A) | 10 | 6.10 |
| 6 | #2 | Li | 3.02 | 10.17 | 0.00 | 0.10 | (A) | 14 | 4.64 |
| 7 | #3 | Li | 3.04 | 8.37 | 23.43 | 0.00 | | 14 | 4.61 |
| 8 | #3 | Li | 1.52 | 8.51 | 11.71 | 0.00 | | 7 | 4.61 |
| 9 | #2 | Li | 2.79 | 9.29 | 0.00 | 0.00 | | 12 | 4.30 |
| 10 | #4 | Li | 4.50 | 8.78 | 24.15 | 0.00 | | 18 | 4.00 |
| 11 | #2 | Na | 1.5 | 10.12 | 0.00 | 0.030 | (A) | 6 | 4.00 |
| 12 | #2 | Li | 3.01 | 10.12 | 0.00 | 0.00 | | 12 | 3.99 |
| 13 | #2 | Na | 3.25 | 12.20 | 0.00 | 0.00 | | 12 | 3.69 |
| 14 | #2 | Li | 4.01 | 8.80 | 0.00 | 0.05 | (B) | 14 | 3.49 |
| 15 | #5 | Li | 5.28 | 9.00 | 24.15 | 0.00 | | 18 | 3.41 |
| 16 | #5 | Na | 3.62 | 8.71 | 24.06 | 0.00 | | 11 | 3.04 |
| 17 | #3 | Li | 1.99 | 10.45 | 0.00 | 0.00 | | 6 | 3.02 |
| 18 | #2 | Li | 4.01 | 9.76 | 0.00 | 0.10 | (A) | 12 | 2.99 |
| 19 | #2 | Li | 1.72 | 9.95 | 0.00 | 0.00 | | 5 | 2.91 |
| 20 | #4 | Li | 3.85 | 10.41 | 0.00 | 0.00 | | 11 | 2.86 |
| 21 | #4 | Na | 3.19 | 8.51 | 24.06 | 0.00 | | 9 | 2.82 |
| 22 | #2 | Li | 3.43 | 10.20 | 0.00 | 0.00 | | 9 | 2.62 |
| 23 | #2 | Li | 0.86 | 9.97 | 0.00 | 0.00 | | 2 | 2.33 |
| 24 | #2 | Li | 2.76 | 9.95 | 0.00 | 0.00 | | 6 | 2.17 |
| 25 | #2 | K | 3.30 | 11.75 | 0.00 | 0.00 | | 7 | 2.12 |
| 26 | #2 | Li | 4.01 | 9.80 | 0.00 | 0.00 | | 8 | 2.00 |
| 27 | #6 | Na | 1.02 | 8.90 | 4.91 | 0 017 | (B) | 4 | 3.92 |
| 28 | #6 | Na | 2.07 | 8.90 | 9.82 | 0.025 | (B) | 8 | 3.86 |
| 29 | #7 | Na | 3.85 | 9.15 | 36.77 | 0.00 | | 11 | 2.86 |
| 30 | #8 | Na | 1.76 | 8.60 | 18.39 | 0.00 | | 5 | 2.84 |
| 31 | #6 | Na | 4.24 | 8.90 | 19.64 | 0.05 | (B) | 11 | 2.59 |
| 32 | #7 | Na | 3.82 | 9.11 | 32.43 | 0 10 | (B) | 9 | 2.36 |
| 33 | #8 | Na | 3.66 | 8.81 | 36.77 | 0.00 | | 7 | 1.91 |
| 34 | #9 | Na | 1.74 | 8.90 | 18.39 | 0.00 | | 3 | 1.72 |

TABLE 1-continued

| Example | Acid | Salt | % Solids | pH | % Alcohol | % Surfactant | # of Releases | Releases/ Solids |
|---|---|---|---|---|---|---|---|---|
| 35 | #9 | Na | 3.50 | 8.90 | 36.77 | 0.00 | 5 | 1.43 |

A = Aerosol OT-75
B = FC 430
All alcohol is isopropyl alcohol, except that in Examples 27, 28, and 31 some of the alcohol is normal propyl alcohol, as follows: 27: 0.90 IPA and 4.01 NPA; 28: 1.80 IPA and 8.02 NPA; and 31: 3.60 IPA and 16.04 NPA.

What is claimed is:

1. A method for molding a plastic comprising coating a mold surface with a mold release agent, permitting said coating to dry, inserting a liquid plastic into said coated mold, allowing the liquid plastic to solidify, and releasing the resulting solid plastic from said mold, said mold release agent comprising an oligomeric salt agent and a diluent, said oligomeric salt agent being the lithium, sodium, or potassium salt, or a mixture thereof, of an oligomer of monomeric units or a mixture of said oligomers, the monomeric units being selected from the group consisting of $C_{14}$ to $C_{24}$ carboxylic fatty acids.

2. The method of claim 1, wherein said plastic is selected from the group consisting of polyurethane, polyisocyanurate, polyurea, and combinations thereof.

3. The method of claim 1, said mold release agent including less than about 0.03% alcohol by weight.

4. The method of claim 3, at least 70% by weight of said oligomeric salt agent being the lithium or sodium salt, or a mixture thereof, of a dimer of monomeric units or a mixture of said dimers, the monomeric units being selected from the group consisting of $C_{18}$ and $C_{22}$ carboxylic fatty acids.

5. The method of claim 3, at least 70% by weight of said oligomeric salt agent being the lithium salt of a dimer of monomeric units or a mixture of said dimers, the monomeric units being selected from the group consisting of $C_{18}$ and $C_{22}$ carboxylic fatty acids.

6. The method of claim 3, the mold release agent further comprising a surfactant in a concentration of about 0.01–0.5% by weight.

7. The method of claim 4, the mold release agent further comprising a surfactant in a concentration of about 0.01–0.5% by weight.

8. The method of claim 5, the mold release agent further comprising a surfactant in a concentration of about 0.01–0.5% by weight.

9. The method of claim 1, wherein the mold release agent used to coat the mold surface is at ambient temperature.

10. The method of claim 1, said oligomeric salt agent being at least 50% by weight of the solids of said mold release agent.

11. A method for molding a plastic comprising coating a mold surface with a mold release agent, permitting said coating to dry, inserting a liquid plastic into said coated mold, allowing the liquid plastic to solidify, and releasing the resulting solid plastic from said mold, said mold release agent comprising an oligomeric salt agent, said oligomeric salt agent being an effective salt, or a mixture of effective salts, of an oligomer of monomeric units or a mixture of said oligomers, the monomeric units being selected from the group consisting of carboxylic fatty acids having at least 14 carbon atoms, said oligomeric salt agent being soluble in water or water/alcohol, said effective salt being effective to solubilize said oligomeric salt agent in water or water/alcohol.

12. The method of claim 11, wherein said an effective salt is the lithium, sodium, or potassium salt, and said mixture of effective salts is a mixture of salts selected from the group consisting of the lithium, sodium, and potassium salts.

13. The method of claim 11, said mold release agent further comprising a diluent, said diluent being selected from the group consisting of water, alcohol, water/alcohol, and water/glycol ether.

14. The method of claim 13, said oligomeric salt agent being at least 50% by weight of the solids of said mold release agent.

15. The method of claim 13, said oligomeric salt agent being present in said diluent in a concentration of about 0.05–10% by weight.

16. The method of claim 13, at least 70% by weight of said oligomeric salt agent being the lithium or sodium salt, or a mixture thereof, of a dimer of monomeric units or a mixture of said dimers, the monomeric units being selected from the group consisting of $C_{18}$ and $C_{22}$ carboxylic fatty acids.

17. The method of claim 13, said mold release agent including less than about 0.03% alcohol by weight.

18. The method of claim 17, said mold release agent further comprising a surfactant in a concentration of about 0.01–0.5% by weight.

19. The method of claim 11, said oligomeric salt agent being completely soluble in water at ambient temperature at a concentration of 3.5% by weight.

20. The method of claim 11, wherein the mold release agent used to coat the mold surface is at ambient temperature.

21. The method of claim 11, wherein said mold release agent consists essentially of said oligomeric salt agent and a diluent.

22. The method of claim 21, wherein said oligomeric salt agent is present in said diluent in a concentration of about 0.05–10% by weight.

23. The method of claim 21, wherein said diluent consists essentially of water.

24. The method of claim 21, said mold release agent further consisting essentially of a surfactant.

25. The method of claim 24, wherein said diluent consists essentially of water.

26. The method of claim 11, wherein said plastic is selected from the group consisting of polyurethane, polyisocyanurate, polyurea, and combinations thereof.

* * * * *